United States Patent
Mullen, Jr.

(10) Patent No.: US 6,208,904 B1
(45) Date of Patent: Mar. 27, 2001

(54) GENERAL PURPOSE DATA COMMUNICATIONS PROTOCOL CONVERTER

(75) Inventor: Robert E. Mullen, Jr., Creedmoor, NC (US)

(73) Assignee: Mitsubishi Electric & Electronics USA, Inc, Durham, NC (US)

( * ) Notice: Subject to any disclaimer, the term of this patent is extended or adjusted under 35 U.S.C. 154(b) by 0 days.

(21) Appl. No.: 08/190,389

(22) Filed: Feb. 2, 1994

(51) Int. Cl.[7] ............................. G05B 15/02; G05B 19/18
(52) U.S. Cl. ............................. 700/9; 700/2; 709/102
(58) Field of Search .................... 700/2, 3, 4, 9, 700/174, 175, 195; 709/102

(56) References Cited

U.S. PATENT DOCUMENTS

| | | |
|---|---|---|
| 4,029,950 | 6/1977 | Haga ........................... 235/151.11 |
| 4,071,911 | 1/1978 | Mazur ........................... 364/900 |
| 4,153,998 * | 5/1979 | McMurtry ..................... 33/174 L |
| 4,387,427 * | 6/1983 | Cox et al. ..................... 364/200 |
| 4,628,478 * | 12/1986 | Henderson, Jr. .............. 364/138 |
| 4,827,446 | 5/1989 | Kawamura ..................... 364/900 |
| 4,829,445 | 5/1989 | Burney ........................... 364/478 |
| 4,901,218 | 2/1990 | Cornwell ....................... 364/131 |
| 5,008,842 | 4/1991 | Nagai et al. ................... 364/551.01 |
| 5,060,133 | 10/1991 | Carter, II ....................... 364/192 |
| 5,197,011 | 3/1993 | Biemans et al. ............... 364/468 |
| 5,198,990 * | 3/1993 | Farzan et al. ................. 364/474.37 X |
| 5,291,416 * | 3/1994 | Hutchins ....................... 364/474.11 X |

OTHER PUBLICATIONS

Walsh, J. et al., "An Automated System for Loading Atmoscan Process Tubes using Intrabay Material Handling Technologies"; 1992; IEEE/SEMI Advanced Semiconductor Man. Conf; (Abstract).*

\* cited by examiner

*Primary Examiner*—William Grant
*Assistant Examiner*—Sheela S. Rao
(74) *Attorney, Agent, or Firm*—Burns, Doane, Swecker & Mathis, L.L.P.

(57) ABSTRACT

A data communications protocol converter for interfacing manufacturing process equipment with a host computer comprises a controller that converts the messages transmitted by the host computer and equipment into messages that meet the protocol of the receiving side. A data acquisition system coupled between the controller and equipment provides a parallel interface to the process equipment and allows the converter to check for/activate logic signals from/to the process equipment. A user interface circuit provides the controller with a user friendly interface that enables the user to set any message parameters and conversation scheme and to interactively communicate with each attached device and edit and re-transmit previously send messages. A software support workstation coupled to the controller through a network provides capability for remote target machine access, software maintenance and configuration modification via the network.

29 Claims, 7 Drawing Sheets

| Component | Direction |
|---|---|
| 1. Host-PC Controller | |
|     Available for Processing | <== |
|     Start Processing Instruction | ==> |
|     Load Start | <== |
|     Process Start | <== |
|     Process End | <== |
|     On-Line Process Completed | <== |
|     Communication Test | <=> |
|     Process Status Query | ==> |
|     Error Message | <== |
| 2. PC Controller-Equipment | |
|     Same as above but different message format | |
| 3. S/W Support Work Station / User I/F CRT - PC Controller | |
|     Monitor Status | ==> |
|     Modify Configuration | ==> |
|     View Error / Communication Logs | ==> |
|     Communication Test / Retry | ==> |
|     Print Instruction | ==> |
| 4. PC Controller - Data Acquisition System | |
|     Activate External Switch | ==> |
|     Detect Switch Closure | <== |

FIG. 5

GENERAL PURPOSE DATA COMMUNICATIONS PROTOCOL CONVERTER

TECHNICAL FIELD

This invention relates generally to data communications protocol conversion, and more particularly, to a protocol converter for interfacing various on-line process equipment with a host computer in a semiconductor manufacturing environment.

BACKGROUND ART

Currently, there is no standard mode of communication between intelligent systems in a computer integrated semiconductor manufacturing environment. As a result, protocol converter systems are employed to act as translators to allow intelligent devices from different manufacturers to communicate with one another. The special purpose protocol converter systems intended to convert specific communications protocols in a manufacturing environment are extremely expensive and designed hard-coded to a specific piece of equipment. The existing general purpose protocol converters are primarily intended for connection of devices with different handshaking schemes, i.e. computer to printer, or between different networks. These converters are not sophisticated enough to provide even minimal functionality in a semiconductor manufacturing environment. For example, the existing protocol converters cannot provide without extensive modifications:

- configurability for different applications in a manufacturing environment,
- extensibility to various communication protocols,
- user friendly interface,
- high data conversion/throughput rates,
- remote system access and maintenance,
- error checking capability,
- message reformatting capability,
- parallel input/output (I/O) link to process equipment for checking various manufacturing conditions,
- printer interface,
- adherence to specific communication standards,
- easy software support.

In view of the above, it would be desirable to provide an improved general purpose data communications protocol converter for interfacing a host computer with manufacturing process equipment, that provides the above-indicated features.

DISCLOSURE OF THE INVENTION

Accordingly, one advantage of the invention is in providing a general purpose data communications protocol converter for interfacing a host computer with manufacturing process equipment in a computer integrated manufacturing environment, that is easily configurable for different applications.

Another advantage of the invention is in providing a protocol converter extensible to various communication protocols.

A further advantage of the invention is in providing a protocol converter having a user friendly interface.

Another advantage of the invention is in providing a protocol converter with increased data conversion/throughput rates.

Another advantage of the invention is in providing remote system access and maintenance of a protocol converter.

A further advantage of the invention is in providing a protocol converter having ability to perform error checking of message parameter contents.

Another advantage of the invention is in providing a protocol converter having ability to perform message reformatting.

Another advantage of the invention is in providing in a protocol converter, a parallel input/output (I/O) link to the process equipment for checking various manufacturing conditions.

A further advantage of the invention is in providing, in a protocol converter, a printer interface that allows a user to output hard copies of source code, communications logs, error logs, etc.

Another advantage of the invention is in providing a protocol converter that can meet specific industry communication standards.

Another advantage of the invention is in providing easy software support of a protocol converter.

A further advantage of the invention is in providing a low cost specific communication standard protocol converter.

The above and other advantages of the invention are achieved, at least in part, by providing a data communications protocol converter that comprises a controller responsive to first messages received from a host computer and process equipment for forming second messages sent to the process equipment and the host computer, and a data acquisition system responsive to a check signal from the controller for checking an operation condition of the process equipment. Data communication protocol of the host computer differs from data communication protocols of the process equipment.

In accordance with a preferred embodiment of the invention, the converter may further comprise a user interface coupled to the controller for defining and controlling parameters of the controller. The user interface may define structures, templates and conversation sequences of the second messages and also define line protocols for communication between the controller and the process equipment, and between the controller and the host computer.

Moreover, the converter may comprise a support workstation coupled to the controller through a telecommunication network for remote defining and controlling parameters of the controller through the communication network.

In accordance with one aspect of the invention, the data acquisition system checks manufacturing process conditions (physical interlock) of the process equipment. The controller sends to the host computer an error message in response to an error signal from the data acquisition system.

In accordance with another aspect, the controller comprises a message processing means for analyzing the first messages and forming the second messages, first message receiving means and second message sending means corresponding to the host computer and the process equipment. The first message receiving means put the first messages in a first queue. The message processing means analyzes the first queue of messages, forms the second messages and puts the second messages in a second queue. The second message sending means receive corresponding second messages of the second queue in accordance with their destination.

In accordance with a further aspect of the invention, the process equipment may comprise a plurality of process units. The controller is responsive to each of the process units, and the data acquisition system is coupled to each of the process units for checking their operation conditions. The controller comprises separate first message receiving means for the host computer and each of said process units, and separate second message sending means for the host computer and each of the process units. The process units may have different data communication protocols.

In the preferred embodiment, the protocols meet Semiconductor Equipment Communication Standard (SECS).

In accordance with the method of this invention, the following steps are carried out:

processing by a controller first messages received from the host computer and process equipment for forming second messages sent to the process equipment and host computer, and checking by a data acquisition system responsive to the controller an operation condition of the process equipment to send an error message to the host computer in response to a predetermined condition.

The method preferably is practiced in the semiconductor manufacturing environment and may comprise the step of defining and controlling parameters of the protocol conversion through an user interface, and the step of remote defining and controlling parameters of the protocol conversion through a telecommunication network.

The step of processing more particularly comprises the steps of:

handling by receiving means first line protocols of data communication between the controller and the host computer and process equipment to receive the first messages, putting the first messages in a message queue, analyzing the first messages in accordance with predetermined parameters of the protocol conversion to form the second messages, putting the second (reply) messages in the queue, sending the second messages to the sending means in accordance with their destination, and handling by the sending means second line protocols of data communication between the controller and the host processor and process equipment to send the second messages.

In the preferred embodiment, the step of analyzing also involves sending a request to the data acquisition system for checking the operation condition of the process equipment.

In accordance with another aspect of the invention, an apparatus for protocol conversion between host data processing means and manufacturing means comprises:

message processing means responsive to the host data processing means and the manufacturing means for converting a first message of a first protocol received from the host data processing means and the manufacturing means into a second message of a second protocol to be sent to the host data processing means and the manufacturing means, and data acquisition means responsive to the message processing means for checking status of the manufacturing means.

In accordance with a further aspect of the invention, a general purpose Semiconductor Equipment Communication Standard (SECS) protocol converter for providing data exchange between a host computer and process equipment comprises:

a protocol converter controller coupled between the host computer and the process equipment for converting data transmitted in accordance with a first SECS protocol into data corresponding to a second SECS protocol, and a user interface coupled to the controller for setting the controller into a mode providing conversion of the first SECS protocol into the second SECS protocol.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 5 illustrates examples of interaction between the converter components shown in FIG. 3.

BEST MODE FOR CARRYING OUT THE INVENTION

The best mode for practicing the invention is based on the realization that the host computer and process equipment communicate with each other using Semiconductor Equipment Communication Standard (SECS) protocols in a semiconductor manufacturing environment.

To more fully appreciate the principles of this invention, the SECS protocols will be described. These protocols were established by the Semiconductor Equipment and Materials Institute, INC. (SEMI) to provide means for communication between intelligent devices in a semiconductor manufacturing environment. The SECS-1 standard was published in 1980. The SECS-2 standard specification was first published in 1982 and has been revised several times since then. The SECS-1 prescribes a communication interface pertaining to message exchange between equipment and a computer and, in particular, provides the basic mechanisms for electrical connectivity, message format and line protocol. The SECS-2 prescribes a method for interpreting messages between a computer and equipment. More specifically, in addition to SECS-1, SECS-2 specifies conventions for data items formats, message formats, and conversations. MSEC is a Mitsubishi specific variation of SECS-2 that is the same in most respects except for that different conventions are used for data item, message format and conversations. For example, SECS-2 specifies message type in the header, while MSEC uses the first several bytes of the data portion of the message. Also, SECS-1, SECS-2 and MSEC define connection of a communication cable to a host computer and prescribe the type of connector, number of pins and signal voltage.

Figure 1:
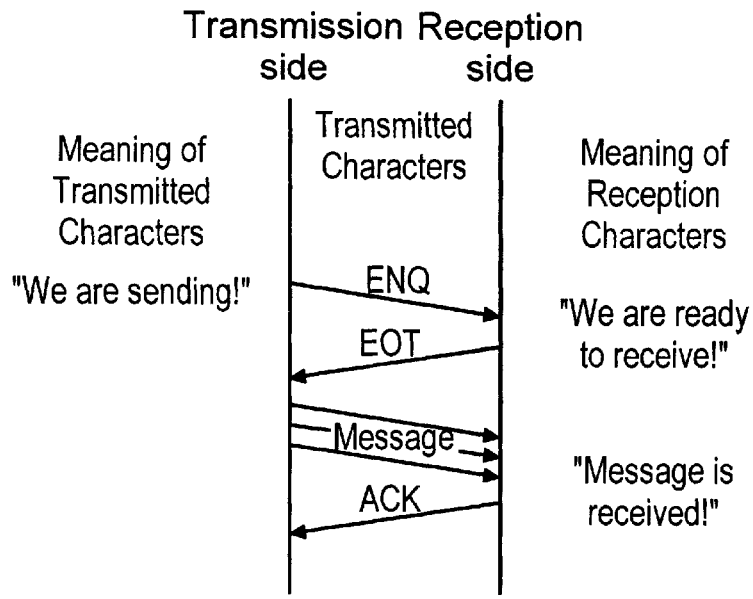
FIG. 1 illustrates a communication procedure in accordance with the SECS protocol.
Figure 2:
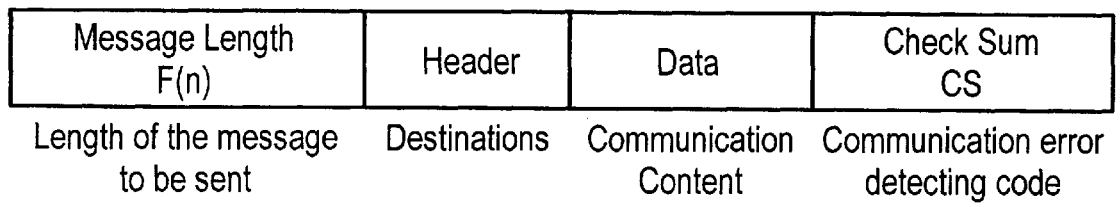
FIG. 2 shows the contents of a message sent in accordance with the protocol illustrated in FIG. 1.

The communication procedure prescribed by the SECS for data exchange is illustrated in FIG. 1. Communication characters are used in this procedure to provide synchronization and determine the start of a particular field within a data block. A transmission side sends the communication character ENQ (inquiry) to indicate the start of transmission. A reception side responses with the character EOT (end of transmission) to show its readiness to receive a message. In response, the transmission side sends the message, content of which is illustrated in FIG. 2. The reception side replies with the communication character ACK (acknowledge) to acknowledge that the message is received.

As shown in FIG. 2, the first field of the message defines the length of the message to be sent. This field is followed by the header that may contain a source or destination code (address) to define source or destination of the message. The data field comprises communication contents (text) of the message. The text may, for example, establish rules for timing during transmission, prescribe how to set the operational parameter of the equipment, and how to output the process result data. The last field (Check Sum) defines a communication error detecting code to be used for error checking.

To operate the equipment automatically, the text of the message prescribes treatment for communication errors and measures to analyze the errors. In particular, the measures to cope with abnormal messages are prescribed (for example, retry or error display). To analyze the errors, storage of communication history (log) and the display format may be prescribed. Further, the text may prescribe on-line operation of the equipment under the instructions of the host computer, and off-line operation performed manually. Moreover, when the equipment is switched from on-line operation to off-line operation, the measures to be taken may be prescribed.

To enable a robot to handle a cassette onto the equipment, for example, the configuration and the control sequence of the cassette stage, as well as the way to send the signals of the cassette stage to inform the robot about existence of a cassette on the cassette stage, may be prescribed in the text.

Figure 3:
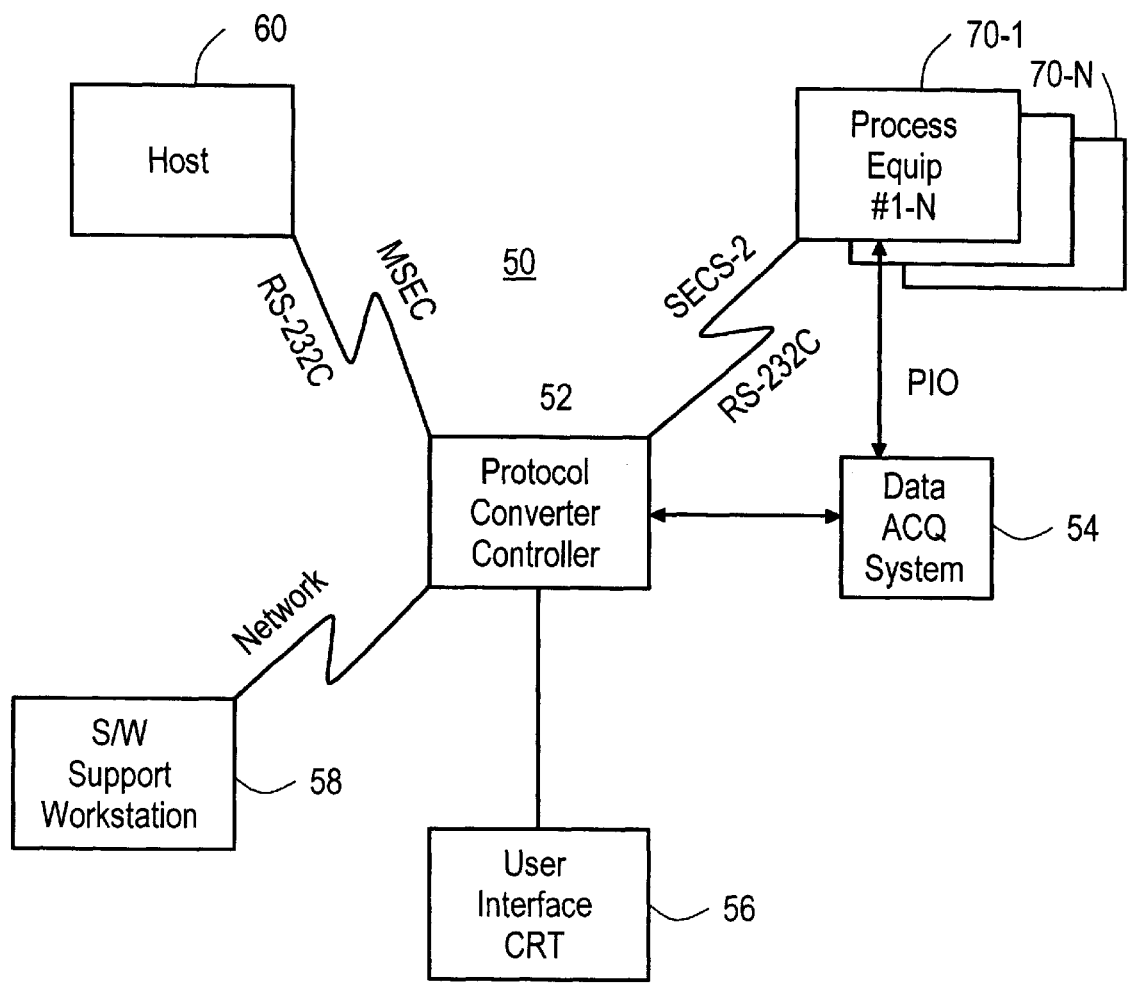
FIG. 3 illustrates a hardware configuration of a protocol converter in accordance with the present invention.

Reference is now made to FIG. 3, showing an exemplary block-diagram of a data communications protocol converter 50 that provides an interface between a host computer 60 operating in accordance with the MSEC standard and process equipment 70 comprising process units 70-1, 70-2, . . . , 70-N communicating in accordance with the SECS-2 standard. The protocol converter 50 comprises a protocol converter controller 52 coupled between the host computer 60 and process equipment 70 through the RS-232C type interface to provide data conversion. A data acquisition (ACQ) system 54 is coupled between the controller 52 and the process equipment 70 to provide a parallel digital I/O (PIO) to the process equipment, which allows the system to check for and activate TTL logic signals from/to the process equipment. For example, the system is enabled to check or activate switch closure in the equipment to signal an error condition, process start, process end, detect workpiece (cassette) presence, equipment interlock, etc. A user interface 56 is coupled to the controller 52 to define various system parameters disclosed in more detail later. For example, the user interface allows the user to specify parameters for the above-indicated interaction through the parallel interface. A software support workstation 58 may be coupled to the controller 52 through a telecommunication network, e.g. Ethernet, to provide the controller with additional functional capabilities. It allows the system to accommodate various equipment-specific portions of the software for all possible application scenarios. As a result, one standardized platform can provide all necessary protocol converter implementations. Moreover, the workstation 58 enables a user to remotely interact with the protocol converter through a network.

Figure 4:
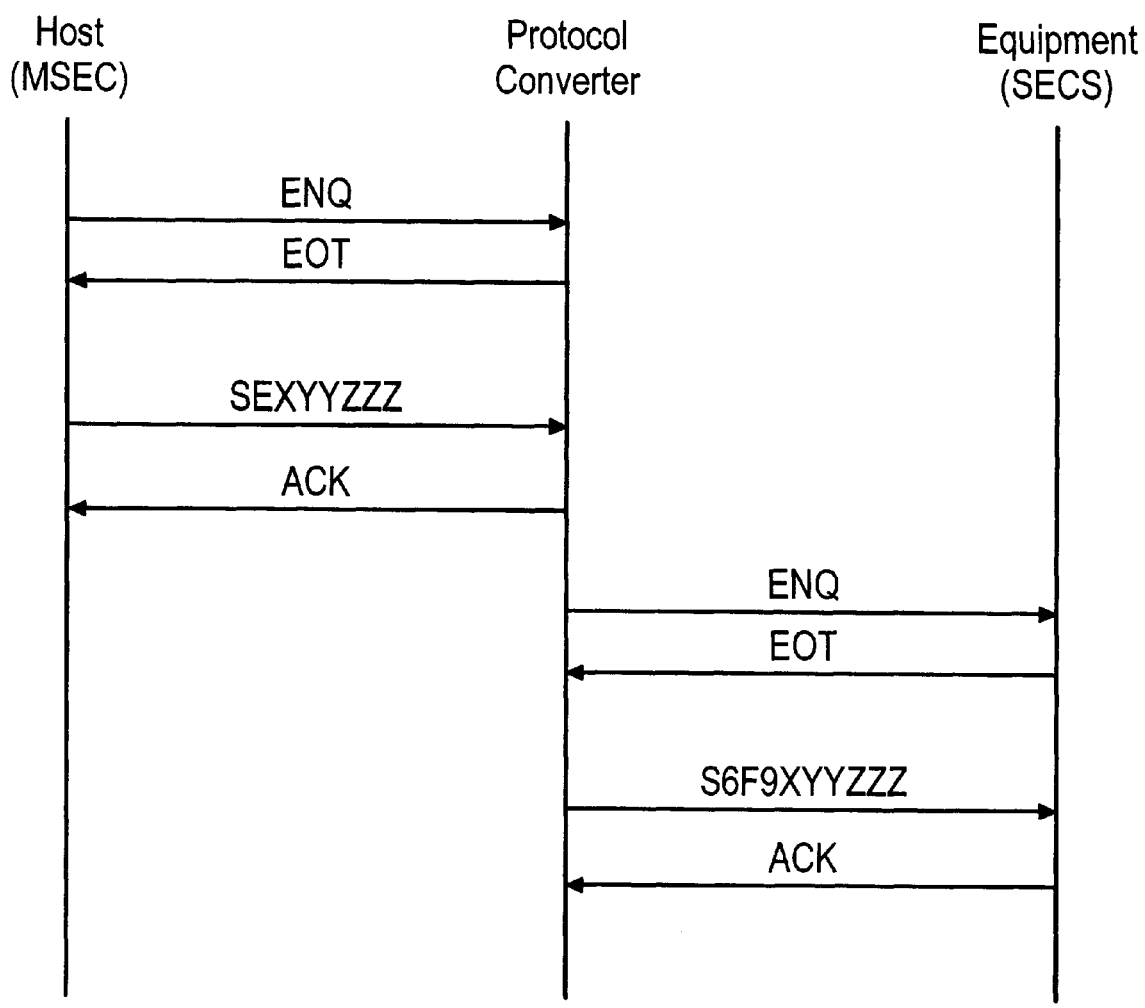
FIG. 4 shows an example of protocol conversion.

The example of the data exchange between the MSEC host computer 60 and the SECS-2 process equipment 70 is shown in FIG. 4. The protocol converter relays the communication characters ENQ, EOT and ACK shown in FIG. 1 and further converts the message SEXYYZZZ transmitted by the host computer in accordance with MSEC protocol into the message S6F9XYYZZZ corresponding to the SECS-2 protocol of the process equipment.

As shown in FIG. 5, wherein the examples of interactions between the hardware components in FIG. 3 are illustrated, the host computer 60 may send to the process equipment 70 through the protocol converter (PC) controller 52 signals to start processing instructions or to inquire process status. The process equipment 70 may inform the host computer 60 through the PC controller 52 regarding its availability for processing, load start, process start and end, on-line process completion or various errors. Further, a communication test may be performed to check various parameters of data communication between host computer and PC controller, and between PC controller and equipment. In addition to data exchange between the host computer and process equipment, the data ACQ system may detect the equipment switch closure indicating particular operation conditions of the process equipment and inform the PC controller about this event. Moreover, the PC controller may activate an external switch of the process equipment in accordance with an instruction from a user or the host computer to set particular modes of operation or process parameters. The user interface 56 and workstation 58 may, for example, monitor status of the PC controller, modify its configuration, supply error or communication logs, request the PC controller to perform communication tests or to print instructions.

Figure 6:
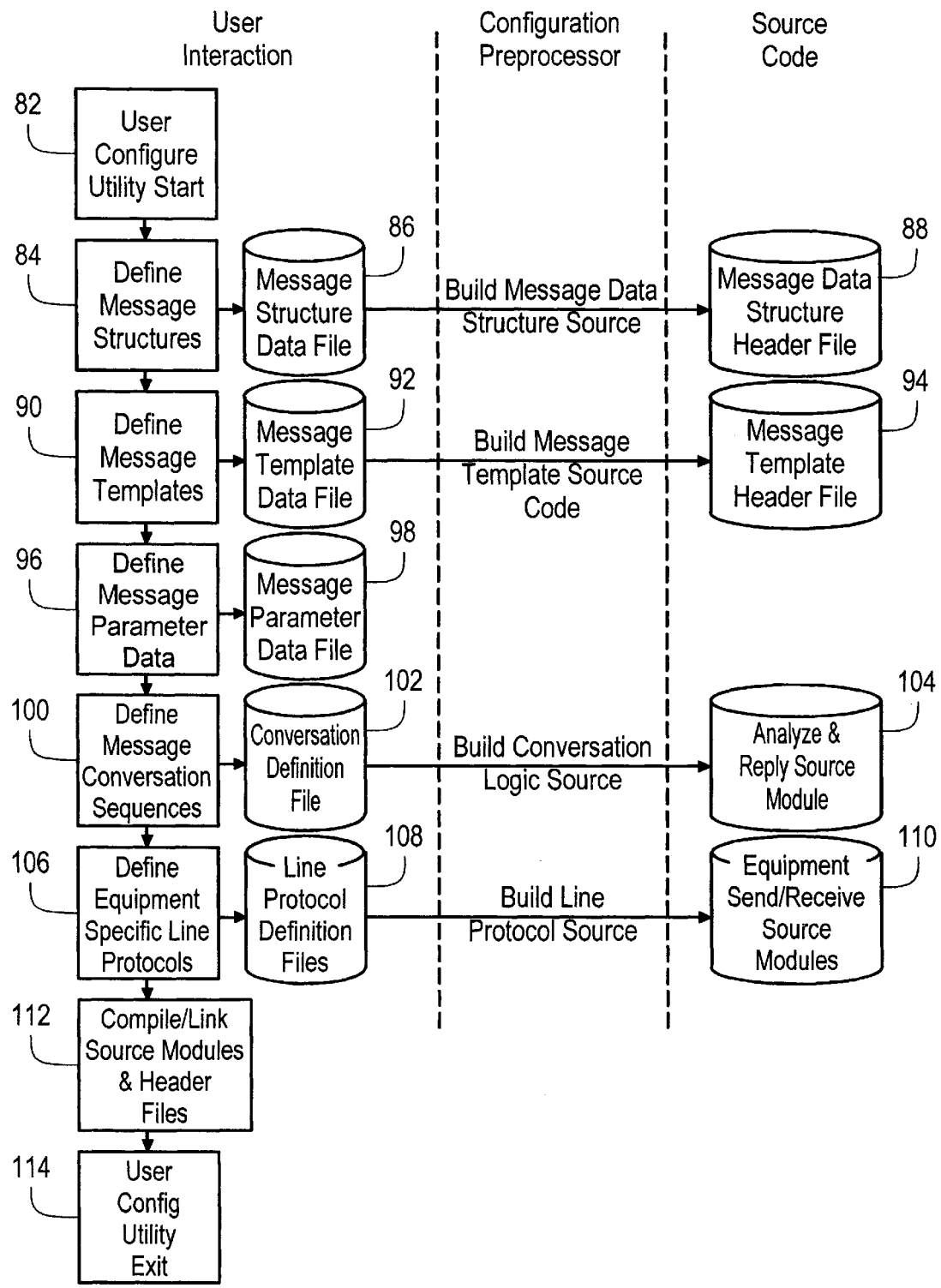
FIG. 6 illustrates a user procedure for setting configuration of protocol conversion.

Referring to FIG. 6, the procedure for establishing configuration of the protocol conversion scheme including the parallel operation of the data ACQ system for monitoring the process equipment, is initiated by a user (block 82) from the user interface circuit 56 or remotely from the support workstation 58. At block 84, the structures of messages coming from the host computer and equipment are defined in a message structure data file 86. A configuration preprocessor of the interface or workstation builds message data structure source code to provide a message data structure header file 88 that defines the fields of interest of the messages. At block 90, the message templates are defined in a message template data file 92. The message templates may represent examples of the messages coming from the host computer and equipment. Then, the message template source code is built as a message template header file 94.

Figure 7:
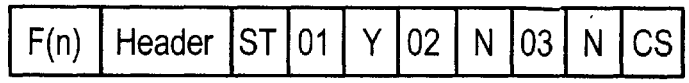
FIG. 7 shows an example of an expression in accordance with MSEC protocol.

At block 96, the user defines message parameters data in a message parameter data file 98. The message parameters are set in accordance with specific parameters and operation modes of the equipment and host processor. For example, the message fields that are required to be captured by the host computer or equipment may be defined by prescribing format and contents of the fields. An exemplary MSEC message transmitted from the equipment to the host computer to start processing is shown in FIG. 7. The function of the message (type of command) is defined by using characters ST (start) following the header. The functions are set in accordance with the type of the equipment. The next fields are prescribed for each type of equipment according to each command or the function of the message. Such parameters as the number of the lane in which the process is started may be set. Some fields may, for example, require the host computer to poll the digital outputs of the equipment corresponding to certain cassette positions in order to check whether these cassette positions are activated before the processing.

At block 100, the message conversation sequences are defined by the user to form a conversation definition file 102. This file represents the rules of forming the message sequences sent by the host processor or equipment, for example, in response to a predetermined message. Based on the conversation file 102, the configuration preprocessor forms an analyze and reply source module 104 as a conversation logic source.

At block 106, line protocol definition files 108 are formed by the user to define the equipment specific line protocols that are used for controlling the data links between the controller and the equipment or host computer. Further, equipment send/receive source modules 110 are built as a line protocol source.

At block 112, the header files 88, 94, source modules 104, 110 and data files 86, 92, 98, 102 and 108 are compiled and linked in a predetermined order to create an executable program that can be used for the protocol conversion procedure. Block 114 represents the exit from the user configuration procedure.

Figure 8:
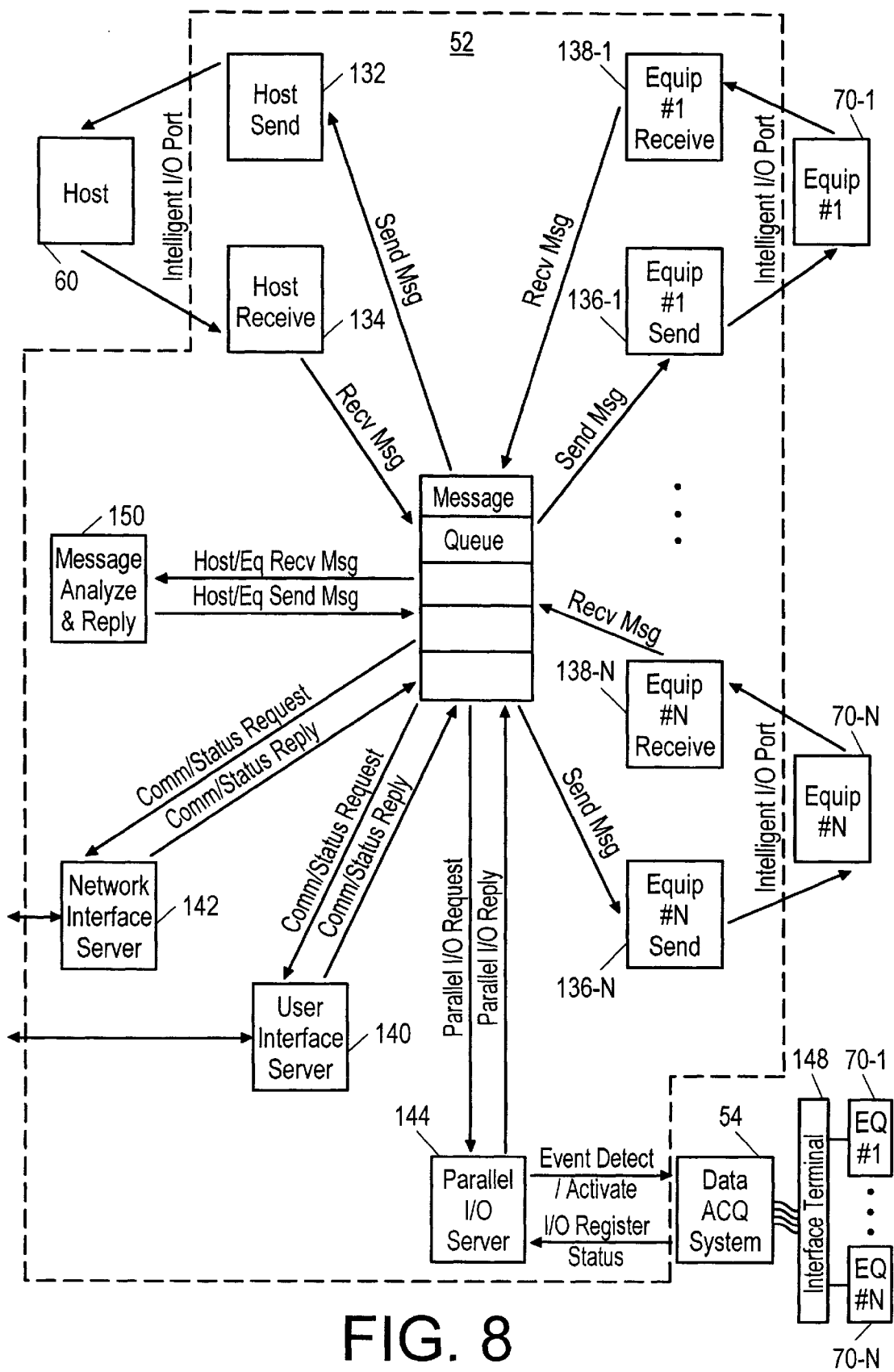
FIG. 8 illustrates software architecture of the protocol converter controller shown in FIG. 3.

Referring to FIG. 8, the protocol converter controller 52 performing the protocol conversion comprises a host sending circuit 132 and a host receiving circuit 134 that provide an interface with the host computer 60 and a plurality of equipment sending circuits 136-1, . . . , 136-N and equipment receiving circuits 138-1, . . . , 138-N that provide interfaces with the corresponding units process units 70-1, . . . , 70-N, respectively. The host processor and process equipment are coupled through intelligent I/O ports of the controller. A user interface server 140 and a network interface server 142 respectively provide interfaces with the user interface circuit 56 and software support workstation 58 shown in FIG. 3. A parallel I/O server 144 couples the controller to the data ACQ system 54, which provides a parallel interface with the process equipment 70-1, . . . , 70-N through an interface terminal 148. A message analyzing and replying circuit 150 is used to form a message to be sent to the equipment or host computer based on the corresponding message received from the host computer or equipment.

Figure 9:
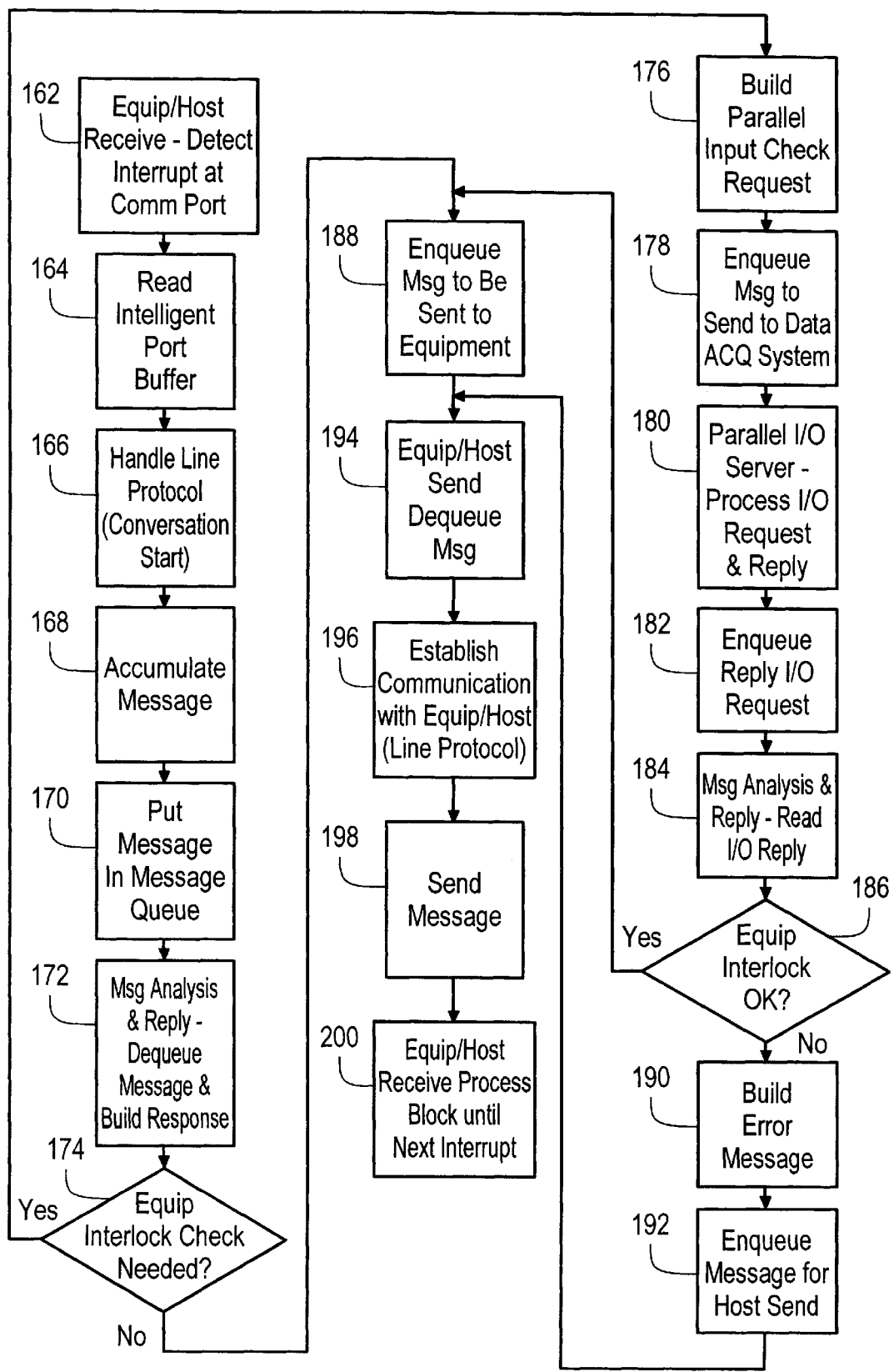
FIG. 9 shows an example of a protocol conversion procedure in accordance with the present invention.

The operation of the protocol converter is as follows. As shown in FIG. 9, the conversion procedure is initiated when any of the equipment receiving circuits 138-1–138-N or host receiving circuit 134 detects an interrupt at the corresponding intelligent I/O port (block 162). The receiving circuit reads data from a buffer of the intelligent port (block 164) and handles the line protocol established by the user to start conversation (block 166). When the receiving circuit accumulates messages sent by the transmitting side (block 168), it puts the message in a message queue shown in FIG. 8 to be sent to the message analyzing and replying circuit 150 (block 170). The circuit 150 analyzes at block 172 fields of the message based on the message structures, parameters, template data and conversation sequences of the data files and modules set by the user during the configuration procedure described above and forms the converted message to be sent to an addressee according to the message destination. If, according to the defined conversation sequences, the sequence of messages should be sent in response to the received message, the analyzing and replying circuit 150 builds the required message sequence rather than a separate message.

However, if the operation data of the equipment defined in the data file require the operation modes or parameters of the equipment to be checked before sending the message to or from the equipment, for example, if the equipment interlock check is needed (block 174), the analyzing and replying circuit 150 builds a parallel input check request (block 176) and puts it in a queue sent to the parallel I/O server 144 (block 178) interacting with the data ACQ system 54. The parallel I/O server 144 processes the request and sends an event detect signal to the data ACQ system 54 to check the required modes or parameters of the equipment 70-1–70-N (block 180). Also, the parallel I/O server may activate the required event by sending an activate event signal through data ACQ system 54 to the equipment. To supply the converter with the requested information, a reply signal is sent by the equipment through the data ACQ system to the parallel I/O server 144, which processes the reply signal and puts it in a queue sent to the analyzing and replying circuit 150 (block 182). This circuit reads and analyzes the response (block 184). If the response indicates that the checked modes or parameters of the equipment correspond to the required modes or parameters, for example, if the equipment interlock is proper (block 186), the analyzing and replying circuit 150 puts the formed converted message in a queue to be sent to the equipment or host computer according to the message destination (block 188). If the equipment check is not required, the procedure goes to block 188 directly from block 174.

However, if the checked equipment mode or operation is not proper, the analyzing and replying circuit 150 builds an error message (block 190), which is put in a queue to be sent to the host sending circuit 132 (block 192).

The corresponding equipment sending circuit or host sending circuit captures the message addressed to this circuit or the error message from the queue (block 194) and handles the line protocol set by the user during the configuration procedure to establish communication with the equipment or host computer (block 196). As a result, the converted message (message sequence) or error message is sent according to its destination (block 198). Then, the host and equipment receiving circuits are blocked until the next interruption (block 200). During the conversion procedure, the user interface server 140 and network interface server 142 respectively controlled by the user interface circuit 56 and support workstation 58 may monitor the status of the procedure.

There accordingly has been described a protocol converter for interfacing manufacturing process equipment with a host computer comprising a controller that converts the messages sent by the host computer and equipment into the messages that meet the protocol of the receiving side. A data acquisition system coupled between the controller and equipment provides a parallel interface to the process equipment and allows the converter to check for/activate logic signals from/to the process equipment. A user interface circuit provides the controller with a user friendly interface that enables the user to set any message parameters and conversation scheme and to interactively communicate with each attached device and edit and re-transmit previously send messages. As a result, the converter can be configured for any communications protocol, in particular, for variations of the SECS based protocols. A software support workstation coupled to the controller through a network provides capability for remote target machine access, software maintenance and configuration modification via the network.

In this disclosure, there are shown and described only the preferred embodiments of the invention, but it is to be understood that the invention is capable of changes and modifications within the scope of the inventive concept as expressed herein.

What is claimed is:

1. A data communications protocol converter for interfacing manufacturing process equipment with a host computer controlling said process equipment, comprising:
   a controller responsive to first messages received from said host computer using a first data communications protocol for forming second messages sent to said process equipment using a second data communications protocol, and
   a data acquisition system providing a parallel digital input/output interface to said process equipment and responsive to a control signal from said controller for checking and activating operation signals supplied to and from said process equipment to check and set process parameters of said process equipment,
   wherein said first data communications protocol differs from said second data communications protocol.

2. The converter of claim 1, further comprising:
   a user interface coupled to said controller for defining and controlling parameters of said controller.

3. The converter of claim 2, wherein said user interface comprises means for defining structures of said second messages.

4. The converter of claim 2, wherein said user interface comprises means for defining templates of said second messages.

5. The converter of claim 2, wherein said user interface comprises means for defining conversation sequences of said second messages.

6. The converter of claim 2, wherein said user interface comprises means for defining line protocols for communication between said controller and said process equipment, and between said controller and said host computer.

7. The converter of claim 1, further comprising a support workstation coupled to said controller through a telecommunication network for remote defining and controlling parameters of said controller through said communication network.

8. The converter of claim 1, wherein said data acquisition system checks manufacturing process conditions of said process equipment.

9. The converter of claim 1, wherein said controller sends to said host computer an error message in response to an error signal from said data acquisition system.

10. The converter of claim 1, wherein said controller comprises a message processing means for analyzing said first messages and forming said second messages.

11. The converter of claim 10, wherein said controller comprises first message receiving means and second message sending means corresponding to said host computer and said process equipment.

12. The converter of claim 11, wherein said first message receiving means put said first messages in a queue for subsequent analysis.

13. The converter of claim 12, wherein said message processing means analyzes said queue of messages, forms said second messages and puts said second messages in the queue to be dispatched.

14. The converter of claim 13, wherein said second message sending means receive said second messages of said queue in accordance with their destination.

15. The converter of claim 1, wherein said process equipment comprises a plurality of process units.

16. The converter of claim 15, wherein said controller is responsive to each of said process units.

17. The converter of claim 16, wherein said data acquisition system is coupled to each of said process units for checking their operation conditions.

18. The converter of claim 16, wherein said controller comprises separate first message receiving means for said host computer and each of said process units.

19. The converter of claim 16, wherein said controller comprises separate second message sending means for said host computer and each of said process units.

20. The converter of claim 16, wherein said process units have different data communication protocols.

21. The converter of claim 1, wherein said protocols meet Semiconductor Equipment Communication Standard (SECS).

22. A method of data communication protocol conversion to interface manufacturing process equipment with a host computer controlling said process equipment, comprising the steps of:
   processing by a controller first messages received from said host computer and process equipment for forming second messages sent to said process equipment and host computer, and
   in response to the preceding step, providing a parallel input/output interface to numerous units of said process equipment for checking and activating operation signals supplied to and from said process equipment to check and set process parameters of said process equipment, and sending an error message to said host computer in response to a predetermined condition,
   wherein data communication protocol of said host computer differs from data communication protocols of said process equipment.

23. The method of claim 22, further comprising the step of defining and controlling parameters of the protocol conversion through an user interface.

24. The method of claim 22, further comprising the step of remote defining and controlling parameters of the protocol conversion through a telecommunication network.

25. The method of claim 22, wherein said step of processing is performed by a controller, and said step of processing comprises the steps of:
   handling by receiving means first line protocols of data communication between said controller and said host computer and process equipment to receive said first messages,
   putting said first messages in a queue,
   analyzing said first messages in accordance with predetermined parameters of the protocol conversion to form said second messages,
   putting said second messages in the queue,
   sending said second messages in accordance with their destination, and
   handling second line protocols of data communication between said controller and said host processor and process equipment to send said second messages.

26. The method of claim 25, wherein said step of checking is performed by data acquisition equipment, and said step of analyzing comprises the step of sending a request to said data acquisition system for checking the operation condition of said process equipment.

27. An apparatus for protocol conversion between a host data processor means and manufacturing equipment comprising:

message processing means responsive to said host data processor and said manufacturing equipment for converting a first message of a first protocol received from said host data processing means and said manufacturing equipment into a second message of a second protocol to be sent to said host data processor and said manufacturing equipment, and data acquisition means providing a parallel digital input/output interface to said manufacturing equipment and responsive to said message processing means for checking and activating status signals supplied to and from said manufacturing means to check and set modes of operation of said manufacturing means.

28. The converter of claim 1, further comprising an input/output server responsive to a request from said controller for activating a required event of said process equipment by sending an activate event signal through said data acquisition system.

29. The converter of claim 1, wherein said first data communication protocol meets a MSEC Standard.

* * * * *